US009888411B2

(12) United States Patent
Lundén (10) Patent No.: US 9,888,411 B2
(45) Date of Patent: Feb. 6, 2018

(54) METHOD AND APPARATUS FOR CONNECTION MANAGEMENT

(71) Applicant: Nokia Corporation, Espoo (FI)

(72) Inventor: Petteri Lundén, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/254,918

(22) Filed: Apr. 17, 2014

(65) Prior Publication Data

US 2014/0315556 A1    Oct. 23, 2014

(30) Foreign Application Priority Data

Apr. 17, 2013   (FI) ...................................... 20135378

(51) Int. Cl.
*H04W 36/00* (2009.01)
*H04W 36/16* (2009.01)
*H04W 24/02* (2009.01)

(52) U.S. Cl.
CPC ... *H04W 36/0061* (2013.01); *H04W 36/0066* (2013.01); *H04W 24/02* (2013.01); *H04W 36/0088* (2013.01); *H04W 36/0094* (2013.01); *H04W 36/165* (2013.01)

(58) Field of Classification Search
CPC ........... H04W 28/081; H04W 36/0022; H04W 36/0061; H04W 36/0066; H04W 36/0088; H04W 36/0094; H04W 36/04; H04W 36/14; H04W 36/16; H04W 36/165; H04W 36/20; H04W 36/24; H04W 36/26; H04W 36/28; H04W 36/30; H04W 76/02; H04W 84/10; H04W 88/06; H04W 72/0453; H04W 16/14; H04W 84/12; H04W 24/10; H04W 72/02; H04W 36/08; H04W 36/0072; H04W 72/1231
USPC .................................................. 455/453, 438
See application file for complete search history.

(56) References Cited

U.S. PATENT DOCUMENTS

| | | | |
|---|---|---|---|
| 6,845,238 B1* | 1/2005 | Muller | 455/436 |
| 2008/0153533 A1* | 6/2008 | Claussen et al. | 455/522 |
| 2009/0054071 A1* | 2/2009 | Mustapha | 455/450 |
| 2010/0197298 A1* | 8/2010 | So | H04W 24/10 455/424 |
| 2011/0256880 A1* | 10/2011 | Golaup et al. | 455/453 |
| 2012/0040673 A1 | 2/2012 | Ying et al. | |
| 2012/0327797 A1 | 12/2012 | Siomina et al. | |

(Continued)

FOREIGN PATENT DOCUMENTS

| | | |
|---|---|---|
| EP | 2410791 A1 | 1/2012 |
| EP | 2437529 A1 | 4/2012 |

(Continued)

*Primary Examiner* — Olumide T Ajibade Akonai
(74) *Attorney, Agent, or Firm* — Seppo Laine Oy (57) ABSTRACT

In accordance with an example embodiment of the present invention, there is provided an apparatus, comprising a receiver configured to receive information describing a first set comprising at least one first environmental radio condition, at least one processing core configured to determine, whether at least one of the at least one first environmental condition is fulfilled, and at least one transmitter configured to cause an indication that the at least one first environmental condition is fulfilled to be sent to a network. The set may comprise a radio fingerprint, which may be received in a user equipment from a base station.

13 Claims, 5 Drawing Sheets

(56) References Cited

U.S. PATENT DOCUMENTS

| | | | | |
|---|---|---|---|---|
| 2013/0040640 A1* | 2/2013 | Chen | ................ | H04W 36/30 455/434 |
| 2014/0045505 A1* | 2/2014 | Henry | ................ | H04W 36/0061 455/444 |
| 2014/0073331 A1* | 3/2014 | Lee | ................ | H04W 8/02 455/444 |
| 2015/0245280 A1* | 8/2015 | Zhou | ................ | H04W 36/32 455/434 |

FOREIGN PATENT DOCUMENTS

| | | |
|---|---|---|
| EP | 2579653 A1 | 4/2013 |
| WO | WO 2009096839 A1 | 8/2009 |
| WO | WO 2010060467 A1 | 6/2010 |
| WO | WO 2010151217 A2 | 12/2010 |
| WO | WO 2012153229 A1 | 11/2012 |

* cited by examiner

METHOD AND APPARATUS FOR CONNECTION MANAGEMENT

TECHNICAL FIELD

The present application relates generally to managing connectivity, for example in heterogeneous wireless communication networks.

BACKGROUND

Wireless communication systems may comprise cellular systems, such as global system for mobile communication, GSM, wideband code division multiple access, WCDMA, or long term evolution, LTE, systems. Wireless communication systems may also comprise non-cellular systems, such as wireless local area network, WLAN, or worldwide interoperability for microwave access, WiMAX, systems.

A wireless terminal, such as for example a smartphone or tablet device, may be furnished with capability to attach to more than one type of system, for example a wireless terminal may attach to GSM and WLAN systems. When both types of system are available, the wireless terminal may decide based on various rules, which type of system to use for communication.

A cellular system may comprise large-area cells, or macrocells, to achieve large-area coverage. A cellular system may comprise small cells, which may be referred to as hotspots, microcells, picocells or femtocells, for example. Small cells may be disposed inside cell coverage areas of macrocells, for example to provide increased communication capacity in areas of high traffic. Small cells may be configured to provide high datarates for data-intensive usage. Small cells may operate using cellular or non-cellular technology, and they may be independent of a wide-area cellular system or comprised in a wide-area cellular system as local hotspots.

Where a small cell resides in a cell coverage area of a macrocell and the small cell is comprised in the same overall system as the macro cell, the system may prefer to offload at least some traffic from the macrocell to the small cell disposed inside the macrocell. This may be achieved by handing over mobiles from the macrocell to the small cell. After such a handover, the mobiles may communicate with the base station or access point controlling the small cell, rather than with the base station controlling the macrocell.

Offloading to small cells may be especially useful in case the small cell operates on a different frequency than a macrocell surrounding it. When the frequency is different, radio communication between a mobile and the base station or access point controlling the small cell cannot cause interference to communications between mobiles and a base station controlling the macrocell. On the other hand, it is more difficult for a mobile to find a small cell operating on a different frequency than a macrocell surrounding the small cell, while the mobile is attached to the macrocell.

SUMMARY

Various aspects of examples of the invention are set out in the claims.

According to a first aspect of the present invention, there is provided an apparatus, comprising a receiver configured to receive information describing a first set comprising at least one first environmental radio condition, at least one processing core configured to determine, whether at least one of the at least one first environmental condition is fulfilled, and at least one transmitter configured to cause an indication that the at least one first environmental condition is fulfilled to be sent to a network.

According to a second aspect of the present invention, there is provided a method, comprising receiving information describing a first set comprising at least one first environmental radio condition, determining whether at least one of the at least one first environmental condition is fulfilled, and causing sending, to a network, an indication that the at least one first environmental condition is fulfilled.

According to a third aspect of the present invention, there is provided an apparatus, comprising at least one processor, at least one memory including computer program code the at least one memory and the computer program code configured to, with the at least one processor, cause the apparatus to at least send information describing a first set comprising at least one first environmental radio condition, receive from a user equipment an indication that the at least one first environmental condition is fulfilled, and send to the user equipment an instruction to cause the user equipment to perform an action.

According to a fourth aspect of the present invention, there is provided a method, comprising sending information describing a first set comprising at least one first environmental radio condition, receiving from a user equipment an indication that the at least one first environmental condition is fulfilled, and sending to the user equipment an instruction to cause the user equipment to perform an action.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
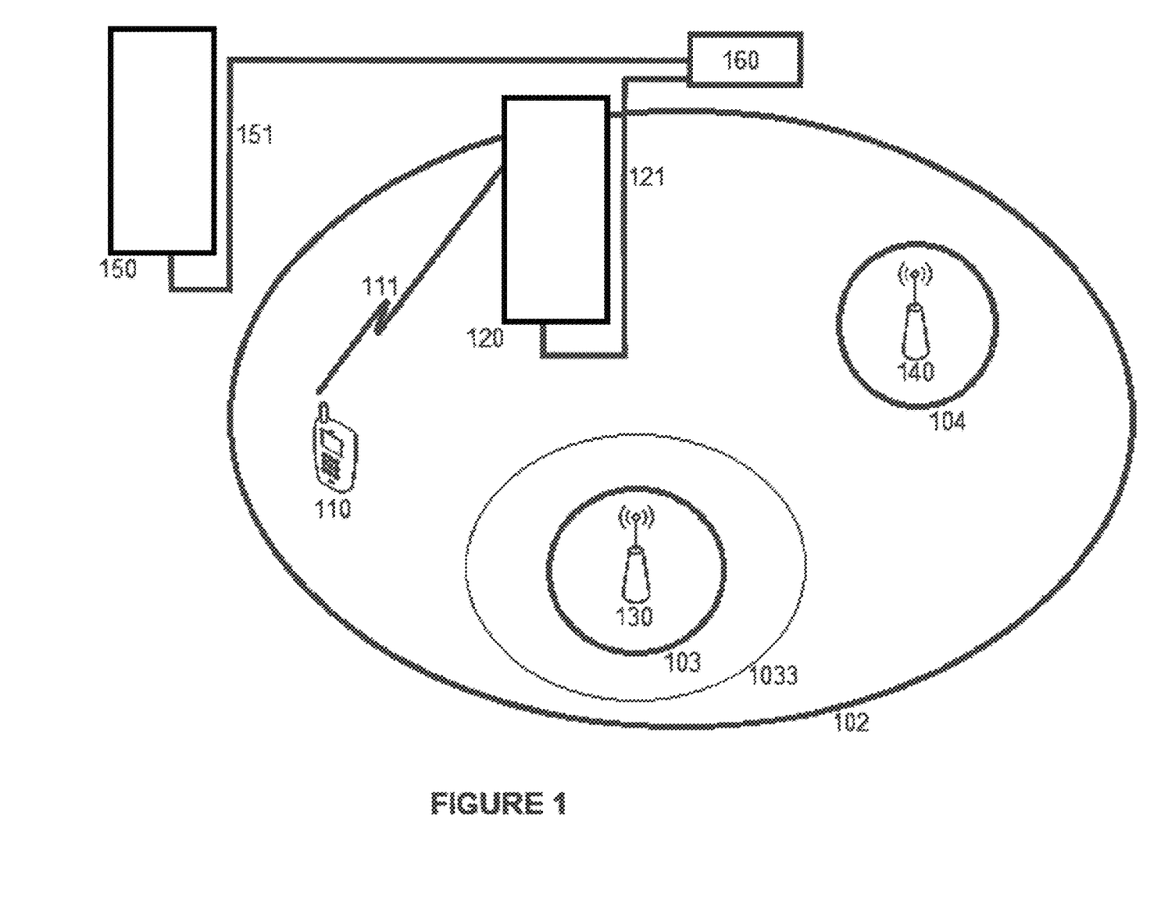
FIG. 1 illustrates an example communication system capable of supporting at least some embodiments of the invention.

FIG. 1 illustrates an example communication system capable of supporting at least some embodiments of the invention. Illustrated is mobile 110, which may comprise, for example, a user equipment, cellular telephone, laptop computer, tablet computer, personal digital assistant, PDA, or other mobile device with connectivity functions. An example of structure of mobile 110 is presented in FIG. 2. Mobile 110 is illustrated as being in radio contact with base station 120 via wireless link 111. Wireless link 111 may comprise an uplink for conveying information from mobile 110 to base station 120. Wireless link 111 may comprise a downlink for conveying information from base station 120 to mobile 110. Wireless link 111 may operate in accordance with an industry standard, for example a cellular standard according to which a network comprising base station 120 also operates.

Base station 120 is connected to node 160 via connection 121. Connection 121 may be a wire-line connection, or at least in part wireless. Node 160 may comprise a radio-access network node, such as radio network controller, RNC, or a core network node, such as a mobility management entity, MME, for example, depending on architecture of the network. Node 160 may be connected to further nodes of a communication network. Such further nodes, which are not illustrated in FIG. 1, may comprise core network nodes such as switches, subscriber databases and gateways, for example. Base station 120 controls cell 102, which may be considered to be a macro cell, for example a cellular macro cell but non-cellular macro cells are also possible.

Base station 150 may be similar to base station 120 in that it may control at least one cell, which is not illustrated in FIG. 1. Should mobile 110 move to an edge of cell 102, it may undergo a handover procedure to a cell controlled by base station 150. Base station 150 is illustrated as being connected to node 160 via connection 151. Connection 151 may be similar to connection 121.

Disposed in cell 102 are small cells 103 and 104. Small cell 103 is controlled by access point 130. Small cell 104 is controlled by access point 140. If mobile 110 is furnished with communications capabilities to communicate using a radio access technology used by base station 120 and a radio access technology used by access point 130, it may attach to either of these nodes when it finds itself in a coverage area of cell 102 and cell 103, in other words in a coverage overlap area of cells 102 and 103. Thus cell 103 may operate in accordance with a different radio access technology than cell 102. In some embodiments, however, they may operate in accordance with the same radio access technology. Cell 104, controlled by access point 140, may operate in accordance with the same radio access technology as cell 103 and/or cell 102, or cell 104 may operate in accordance with a radio-access technology that is different from both cell 102 and cell 103.

While access point 130 and access point 140 are referred to herein as access points, this is merely a terminological choice taken to disclose the present invention in clear terms. In some implementations of the invention, they may be considered to be base stations, for example. In some embodiments, at least one of access point 130 and access point 140 are operably connected to the same network as base station 120. When an access point is operably connected to the same network as base station 120, the access point may be used for offloading traffic from cell 102 to a cell controlled by the access point. When an access point such as access point 130 or access point 140 is not connected to the same network as base station 120, the access point may still be used for offloading traffic from cell 102 provided there is a technical relationship between the access point and the network comprising base station 120. A technical relationship may comprise an arrangement, such as a configuration in the access point, allowing handovers of cell 102 subscribers to a cell controlled by the access point.

When a small cell operates on a same frequency range as a macrocell, a mobile in the macrocell can search for the small cell by measuring for radio energy broadcasted by the small cell without switching to another frequency range from the frequency range used in the macrocell. A small cell operating on the same frequency range may thus be easily detectable to a mobile, but on the other hand a small cell operating on the same frequency range may interfere with operation of the macrocell. In detail, a mobile handed over from the macrocell to such a small cell may cause interference to the macrocell while communicating with the small cell.

A small cell operating on a different frequency range than a macrocell, on the other hand, may be more difficult for a mobile to find since energy transmitted from the small cell propagates on a different frequency than the one used in the macrocell. In order to detect energy transmitted from the small cell, the mobile needs to change its operating frequency and perform a measurement on the new frequency. A small cell operating on a different frequency range than a macrocell may be desirable for use in offloading, since the small cell doesn't interfere with the macrocell due to the frequency separation, and likewise a mobile communicating in such a small cell no longer causes interference to traffic of the macrocell. In general in terms of FIG. 1, base station 120 may operate on a first frequency range, access point 130 may operate on a second frequency range and access point 140 may operate on a third frequency range.

To discover a small cell operating on a different frequency range from a range a mobile is currently using to communicate with a macro cell, a mobile may employ various methods. Firstly, a mobile may be configured with gaps in communication with a macro cell base station, so that the mobile may measure for energy transmitted by small cells during the gaps. Measurements on a different frequency range than one used for current communication may be known as inter-frequency measurements. An example of such a method is the compressed mode of WCDMA, which allows a communication state to remain active with a macro cell while measurements take place during gaps introduced on a physical layer. Secondly, a mobile may be advised by a macro base station concerning small cells disposed in a coverage area of a cell controlled by the macro base station. For example, the macro base station may advise that a small cell is available at a certain distance from the macro base station, the distance being communicated in terms of radio propagation delay, for example. Where a mobile is capable of determining its geolocation, it may be advised concerning geolocations of small cells. When in the vicinity of a small cell, the mobile may then perform inter-frequency measurements to definitively detect the presence of the small cell by measuring energy transmitted by an access point, or base station, controlling the small cell.

A mobile may store a set comprising at least one radio condition to assist in triggering procedures, such as for example triggering inter-frequency measurements, configuring intra-frequency measurement parameters or triggering the making of handover decisions. A radio condition may be an environmental radio condition, wherein an environmental radio condition relates to radio characteristics of surroundings of a mobile. In some embodiments of the invention, such sets may be referred to as fingerprints. A set, or fingerprint, may define radio conditions measurable on the frequency range used for active communication, such as a frequency range used by a macro cell, for triggering procedures. Such radio conditions may comprise, for example, at least one identity of a base station, access point or cell operating on the frequency range used for active communication. When such a cell or node is detectable, the condition may be fulfilled. Another example is a combination of at least two such identities, the condition being fulfilled when all of the at least two cells or nodes are detectable. A yet further possible condition is a signal strength, which may be associated with a detectable identity. For example, a cell with a certain identity must be detectable, and simultaneously a radio signal strength of a beacon transmitted by the cell must fall within a specified range for the condition to be fulfilled. Combinations of such, and other, conditions may be defined to form a set of radio conditions. In some embodiments, when all conditions comprised in a set are fulfilled, the set as a whole may be seen as fulfilled.

A mobile may define a set of conditions responsive to detecting a small cell, so that the mobile may more easily detect the same small cell again later on. In detail, a mobile may store a set of at least one prevailing radio condition before initiating an inter-frequency measurement, and responsive to finding a small cell during the inter-frequency measurement the mobile may store the at least one stored condition as a set of radio conditions, or fingerprint, associated with the newly discovered small cell. When the radio conditions of the set, or fingerprint, are later on fulfilled the mobile may trigger a new inter-frequency measurement to re-discover the cell, for example a few days later when again roaming in the same area.

A macro base station may configure sets of radio conditions in mobiles roaming in cell coverage areas of cells controlled by the macro base station. For example, the macro base station may be configured to provide at least one set to mobiles in connection with the mobiles handing over to a cell controlled by the macro base station. In terms of FIG. 1, base station 120 may provide mobile 110 information defining at least one such set over wireless link 111. In some embodiments, a macro base station provides such sets to mobiles attached to it responsive to a load status of a cell controlled by the macro base station fulfilling a condition, such as for example becoming highly loaded. Other examples of conditions include a low load in a small cell corresponding to a set of radio conditions to be provided, and a load of such a small cell being low relative to a load of a cell controlled by the macro base station.

In some embodiments, when mobile 110 determines that all conditions comprised in a set are fulfilled, the mobile may provide an indication of this to base station 120. In some embodiments, mobile 110 is configured to provide the indication to base station 120 responsive to a subset of the conditions comprised in the set being fulfilled. Criteria defining a subset may be pre-defined in mobile 120, or in the set. Such criteria may define, for example, that at least one of the conditions must be fulfilled to trigger the provision of the indication, or that all the conditions except one must be fulfilled, such that any single condition may be unfulfilled while simultaneously all other conditions in the set are fulfilled, to trigger the indication. For example, if the set comprises six conditions, any five of them, or indeed all of them, being simultaneously fulfilled would in these embodiments be enough to trigger provision of the indication to base station 120. The indication may comprise an identity of the set. Responsive to receiving this indication, base station 120 may instruct mobile 110 to perform at least one inter-frequency measurement. Alternatively, mobile 110 may perform the inter-frequency measurement independently, without instruction to do so from base station 120. Such independent inter-frequency measurement may comprise mobile 110 informing base station 120 of the conditions in the set being fulfilled and then starting the inter-frequency measurement without waiting for an instruction from base station 120, or mobile 110 may start the inter-frequency measurement without even informing base station 120 of the fulfillment of the conditions in the set. Base station 120 may use the identity of the set to select the frequency on which to instruct mobile 110 to perform the inter-frequency measurement. For example, where the set of conditions identified in the indication from mobile 110 is a set associated with access point 130, base station 120 may instruct mobile 110 to perform measurements on a frequency range used by access point 130. A condition area 1033 is illustrated in FIG. 1 around cell 103 to schematically illustrate an area where a set of radio conditions associated with access point 130 may be fulfilled. When mobile 110 finds the conditions to be fulfilled, it is likely within condition area 1033, and consequently it may be capable of detecting access point 130 using an inter-frequency measurement.

Base station 120 may compile statistical information on sets of conditions that it has provided to mobiles. Where base station 120 determines that mobiles tend to not report a certain set of conditions as being fulfilled at all, or only rarely, base station 120 may responsively cease providing that set of conditions to mobiles. Base station 120 may be configured to receive from mobiles information defining sets of conditions, which base station 120 may begin to provide to further mobiles. Thus base station 120 may overall be configured to receive and provide sets of conditions, and to manage sets of conditions in that sets producing few results are no longer provided to mobiles.

Base station 120, or the network in general, may also obtain information indicating that a small cell corresponding to the sets of conditions is no longer in use, or is currently having a high load. In this case base station 120 or the network may refrain from providing that particular set of conditions to mobiles.

In general there is provided a first apparatus, such as for example mobile 110 or a control device for inclusion in mobile 110, to at least in part control the functioning of mobile 110. Such a control device may comprise a processor or chipset, for example. The first apparatus may comprise a receiver configured to receive information describing a first set comprising at least one environmental radio condition. The set may comprise a radio fingerprint. Where the first apparatus comprises a mobile 110, the receiver may comprise a radio receiver of mobile 110. Where the first apparatus comprises a control device, the receiver may comprise an input port of the control device, which may be arranged to receive information when the control device is implanted in mobile 110, internally in mobile 110, via electrical leads internal to mobile 110. The first apparatus may comprise at least one processing core configured to determine, whether at least one of the at least one first environmental radio condition is fulfilled. The at least one processing core may be comprised in a control device comprised in mobile 110, for example. The first apparatus may further comprise at least one transmitter configured to cause an indication that the at least one first environmental condition is fulfilled to be sent to a network. The transmitter may be a radio transmitter of mobile 110, or where the first apparatus is a control device, the transmitter may comprise an output port of the control device, arranged to provide signals to the radio transmitter of mobile 110 when the control device is implanted in mobile 110. The sending of the indication may occur responsive to the determination.

In some embodiments, the indication that the at least one first environmental condition is fulfilled comprises an identity of the first set. In some embodiments, the receiver is further configured to receive an instruction to cause the apparatus to perform a radio measurement on a first frequency, the instruction being conveyed via a second frequency. In other words, instruction may be an instruction for the apparatus to perform, or cause to be performed, an inter-frequency measurement.

In some embodiments, the receiver is further configured to receive a second set, the second set comprising at least one second environmental radio condition. The second set may comprise a radio fingerprint. In some embodiments, at least one of the at least one first and/or second environmental radio conditions comprises at least one condition relating to at least one of a cell identity and a cell signal strength. For example, an environmental radio condition may be satisfied when a received signal level satisfies a condition, such as being between a minimum value and a maximum value. As another example, an environmental radio condition may be satisfied when user equipment detects a cell having a given identity.

In general there is provided a second apparatus, such as for example base station 120 or a control device for controlling the functioning of base station 120. The second apparatus may be caused to, by at least one processor and computer instructions stored in a memory, to send information describing a first set comprising at least one first environmental radio condition. The first set may comprise a radio fingerprint, for example. The first set may be sent to a user equipment such as mobile 110, over a radio interface, for example. The second apparatus may further be caused to receive from a user equipment an indication that at least one of the first environmental conditions is fulfilled, and further to send to the user equipment an instruction to cause the apparatus to perform an action. The instruction may be sent over a radio interface. The instructions may be sent responsive to the indication. In some embodiments, the indication received from the user equipment comprises an identity of the first set. In some embodiments also information describing the current environmental radio conditions is sent by the user equipment as part of the indication or separately. The current environmental conditions may comprise additional or more extensive environmental information than that configured for the user equipment in the first set. This may enable the network to perform more extensive matching of radio condition information, such as for example fingerprint information.

In some embodiments, the action comprises at least one of performing a measurement on a given frequency, initiating handover to another radio access technology and taking into use at least one new parameter or configuration, such as a handover parameter. The measurement may be an inter-frequency measurement, wherein the instruction may define the frequency range to be measured. The handover may be an inter-radio access technology, inter-RAT, handover. An inter-RAT handover may comprise a handover from a cellular to a non-cellular radio-access technology. A new configuration may comprise a discontinuous reception, DRX, configuration, for example. A new handover parameter may comprise a hysteresis parameter, for example, that defines thresholds for triggering measurements, measurement reports and/or handover initiations.

In some embodiments, the apparatus is configured to store a second set comprising at least one second environmental radio condition. In some embodiments, the first and second sets comprise first and second radio fingerprints, respectively.

Figure 3:
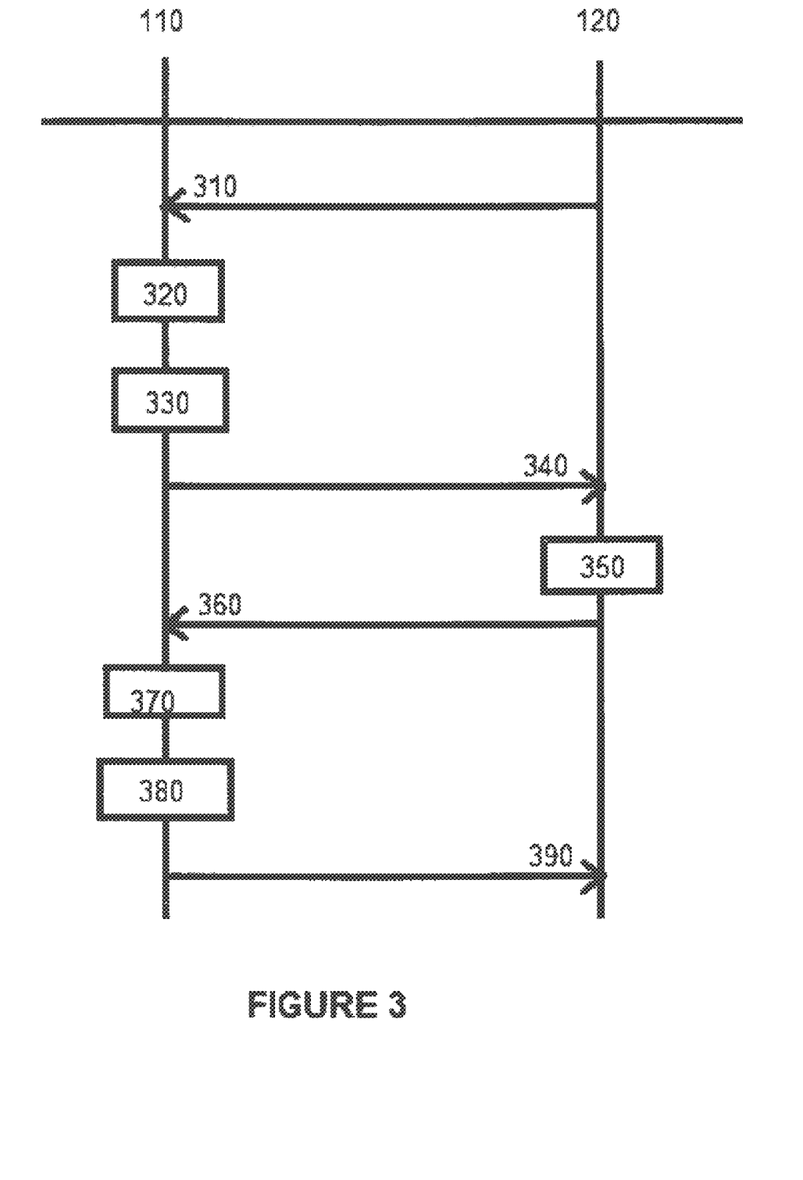
FIG. 3 is a signaling diagram showing operations for a method in accordance with at least some embodiments of the invention.

FIG. 3 is a signaling diagram showing operations for a method in accordance with at least some embodiments of the invention. On the vertical axes are illustrated mobile 110 and base station 120. Time advances from top to bottom. In phase 310, base station 120 provides to mobile 110 information defining at least one set of environmental radio conditions, such as for example at least one radio fingerprint. In phase 320, mobile 110 performs radio measurements and compares results of such measurements to conditions comprised in the at least one set of conditions received in phase 310. The measurements of phase 320 may be intra-frequency measurements in the sense that they occur on a same frequency band as is used by mobile 110 for communication with at least one base station. In phase 330, mobile 110 may determine, based on the measurements of phase 320, if environmental radio conditions of any of the sets of environmental radio conditions received in phase 310 are satisfied. A set may be considered satisfied if all conditions comprised in the set are simultaneously satisfied, or, for example, if all but one condition comprised in the set are simultaneously satisfied. Responsive to a determination in phase 330 that at least one of the sets is satisfied, mobile may in phase 340 indicate this to base station 120. The indication of phase 340 may comprise an identity of a set the conditions of which are satisfied. In phase 350, base station 120 may determine which frequency the set indicated in phase 340 as satisfied corresponds to, and in phase 360 base station 120 may instruct mobile 110 to perform an inter-frequency measurement on this determined frequency. Optionally, in phase 350 base station 120 may increment information stored in base station 120 to reflect the fact that the set indicated by mobile 110 has been indicated as satisfied, to facilitate determining at a later point in time which sets are indicated by mobiles only rarely, or never. In phase 370, responsive to the instruction of phase 360, mobile 110 may perform an inter-frequency measurement. In phase 380 mobile 110 may determine if a small cell on the measured frequency has been discovered, and if such a cell is discovered in the measurement of phase 370, mobile 110 may indicate the discovery to base station 120, which is illustrated as phase 390.

Figure 4:
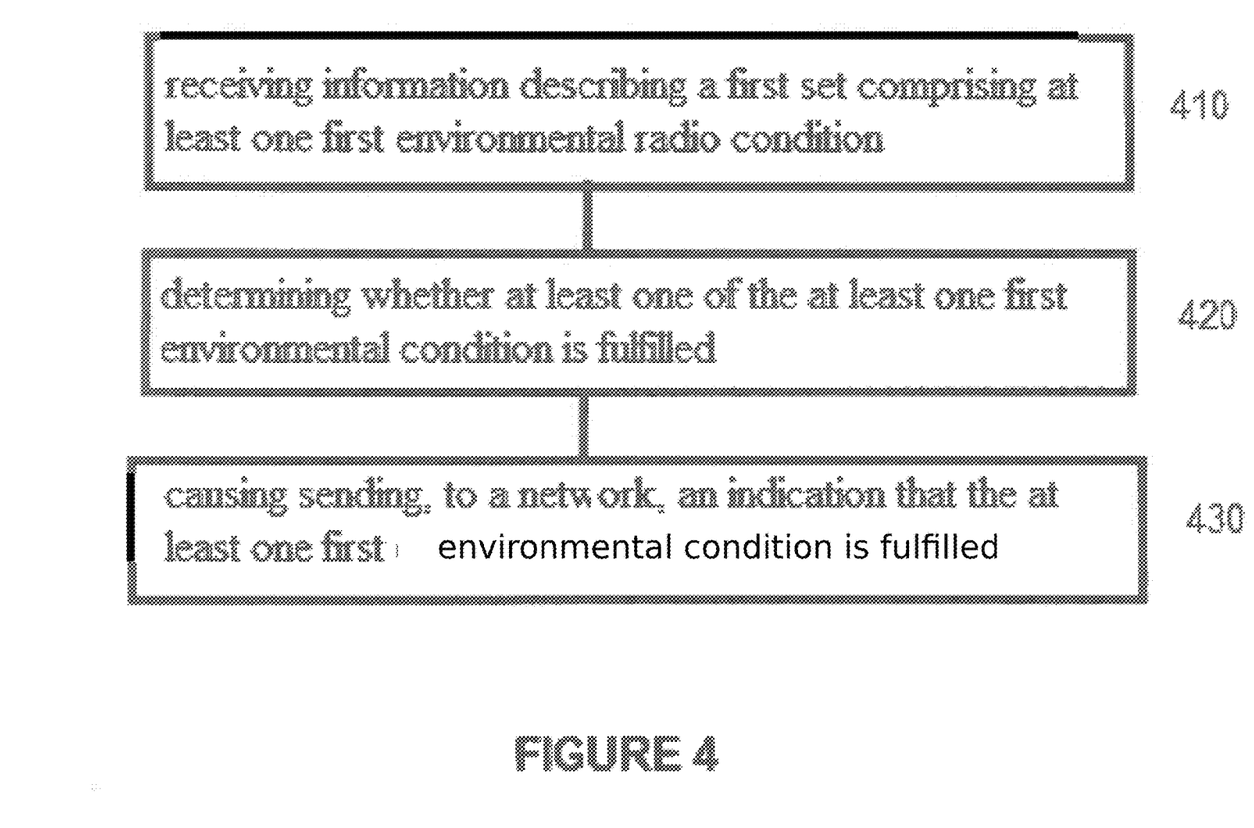
FIG. 4 is a first flowgraph illustrating a method in accordance with at least some embodiments of the invention.

FIG. 4 is a first flowgraph illustrating a method in accordance with at least some embodiments of the invention. The illustrated method may be performed in mobile 110, for example. Phase 410 comprises receiving information describing a first set comprising at least one first environmental radio condition. Phase 420 comprises determining whether at least one of the at least one first environmental condition is fulfilled, and finally phase 430 comprises causing sending, to a network, an indication that the at least one first environmental condition is fulfilled. Phase 430 may comprise, for example, that a control device implanted in mobile 110 signals via electrical leads internal to mobile 110 to a radio transmitter of mobile 110, to cause the radio transmitter to transmit information toward a network, for example to a base station. In some embodiments, phase 420 comprises determining whether each of the at least one first environmental condition is fulfilled. In some embodiments, phase 420 comprises determining whether all except one of the at least one first environmental condition is fulfilled. In these lastly mentioned embodiments, thus, for example, where the first set comprises five first environmental conditions, phase 420 comprises determining whether any four of the five first environmental conditions are fulfilled.

Figure 5:
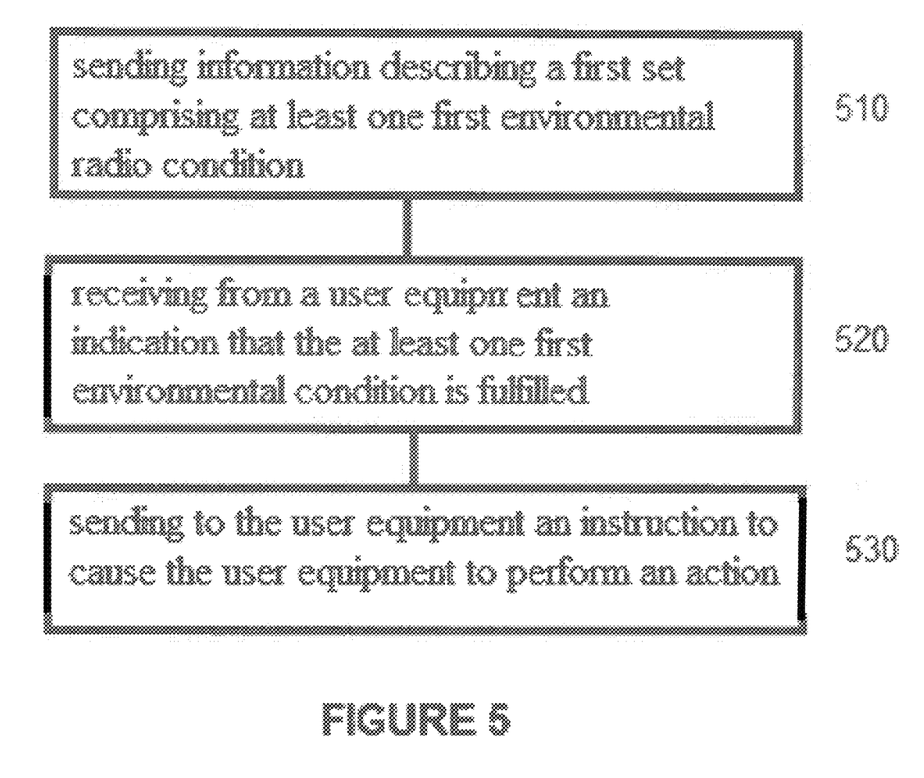
FIG. 5 is a second flowgraph illustrating a method in accordance with at least some embodiments of the invention.

FIG. 5 is a second flowgraph illustrating a method in accordance with at least some embodiments of the invention. The illustrated method may be performed in base station 120, for example. Phase 510 comprises sending information describing a first set comprising at least one first environmental radio condition. Phase 520 comprises receiving from a user equipment an indication that the at least one first environmental condition is fulfilled, and phase 530 comprises sending to the user equipment an instruction to cause the user equipment to perform an action.

Figure 2:
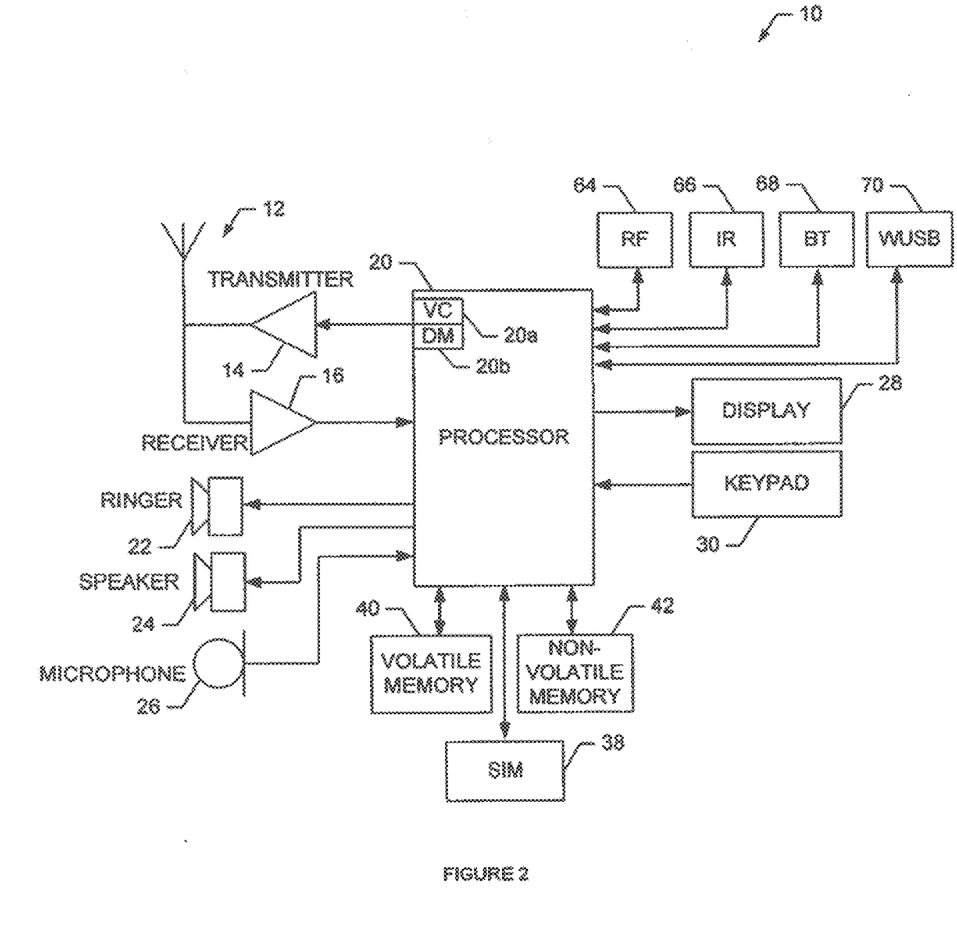
FIG. 2 illustrates a block diagram of an apparatus in accordance with an example embodiment of the invention.

FIG. 2 illustrates a block diagram of an apparatus 10 such as, for example, a mobile terminal or base station, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analogue or TDMA/CDMA/analogue phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analogue-to-digital converter, a digital-to-analogue converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that discovery of small cells is made more efficient. Another technical effect of one or more of the example embodiments disclosed herein is that management of radio condition sets in base stations is enhanced. Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including computer program code
   the at least one memory and the computer program code configured to, with the at least one processor, cause the apparatus to perform at least the following:
      send information describing a first set comprising at least one first environmental radio condition concerning a first frequency band, wherein each of the at least one first environmental radio condition comprises at least one condition relating to at least one of: a cell identity of a cell operating on the first frequency band, a base station identity of a base station operating on the first frequency band and an access point identity of an access point operating on the first frequency band;
      send information defining a second set, the second set comprising at least one second environmental radio condition, the first set being associated with a first small cell operating on a second frequency band and the second set being associated with a second small cell, and
      receive from a user equipment an indication that the at least one first or second environmental condition is fulfilled,
      wherein the apparatus is configured to determine whether the apparatus has received less than a threshold amount of indications comprising an identity of the first set, and responsive to a determination the apparatus has received less than the threshold amount of such indications, to cease sending information describing the first set.

2. An apparatus according to claim 1, the indication comprising an identity of the first set.

3. An apparatus according to claim 1, wherein the action comprises at least one of performing a measurement on a given frequency, initiating handover to another radio access technology and taking into use at least one new handover parameter.

4. An apparatus according to claim 1, wherein the apparatus is caused to send information describing the first set responsive to a determination that a load level in a cell controlled by the apparatus fulfils a predefined condition.

5. An apparatus according to claim 1, wherein each of the at least one first environmental radio condition comprises a signal strength range associated with the at least one of the cell identity, base station identity or access point identity.

6. A method, comprising:
sending, from an apparatus, information describing a first set comprising at least one first environmental radio condition concerning a first frequency band, wherein each of the at least one first environmental radio condition comprises at least one condition relating to at least one of a cell identity of a cell operating on the first frequency band, a base station identity of a base station operating on the first frequency band and an access point identity of an access point operating on the first frequency band;
sending information defining a second set, the second set comprising at least one second environmental radio condition, the first set being associated with a first small cell operating on a second frequency band and the second set being associated with a second small cell;
receiving from a user equipment an indication that the at least one first or second environmental condition is fulfilled, and
determining whether the apparatus has received less than a threshold amount of indications comprising an identity of the first set, and responsive to a determination the apparatus has received less than the threshold amount of such indications, ceasing sending information describing the first set.

7. A method according to claim 6, the indication comprising an identity of the first set.

8. The apparatus according to claim 7, wherein the at least one first environmental radio condition comprises that at least two of a cell with the cell identity, a base station with the base station identity and an access point with the access point identity are detectable to the apparatus.

9. A method according to claim 6, wherein the action comprises at least one of performing a measurement on a given frequency, initiating handover to another radio access technology and taking into use at least one new handover parameter.

10. A method according to claim 6, wherein the information describing the first set is sent responsive to a determination that a load level in a cell controlled by an apparatus fulfils a predefined condition.

11. A method according to claim 6, wherein each of the at least one first environmental radio condition comprises a signal strength range associated with the at least one of the cell identity, base station identity or access point identity.

12. A computer program product comprising a non-transitory computer-readable medium bearing computer program code embodied therein for use with a computer, the computer program code comprising:
code for sending, from an apparatus, information describing a first set comprising at least one first environmental radio conditions concerning a first frequency band, wherein each of the at least one first environmental radio condition comprises at least one condition relating to at least one of: a cell identity of a cell operating on the first frequency band, a base station identity of a base station operating on the first frequency band and an access point identity of an access point operating on the first frequency band;
code for sending information defining a second set, the second set comprising at least one second environmental radio condition, the first set being associated with a first small cell operating on a second frequency band and the second set being associated with a second small cell;
code for receiving from a user equipment an indication that the at least one first or second environmental condition is fulfilled, and
code for determining whether the apparatus has received less than a threshold amount of indications comprising an identity of the first set, and responsive to a determination the apparatus has received less than the threshold amount of such indications, ceasing sending information describing the first set.

13. The computer program product according to claim 12, wherein each of the at least one first environmental radio condition comprises a signal strength range associated with the at least one of the cell identity, base station identity or access point identity.

* * * * *